No. 745,066. PATENTED NOV. 24, 1903.
W. E. KOCH.
FISH HOOK.
APPLICATION FILED SEPT. 17, 1903.
NO MODEL.
Fig.1
Fig.2
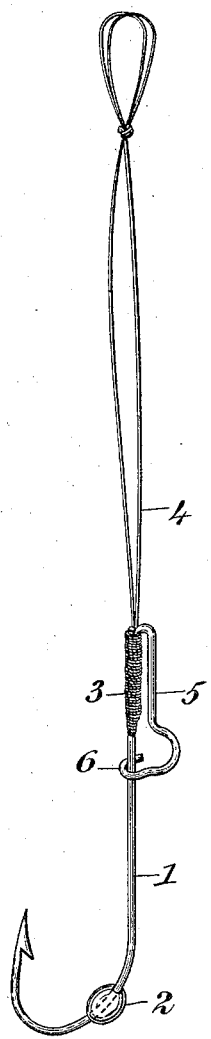
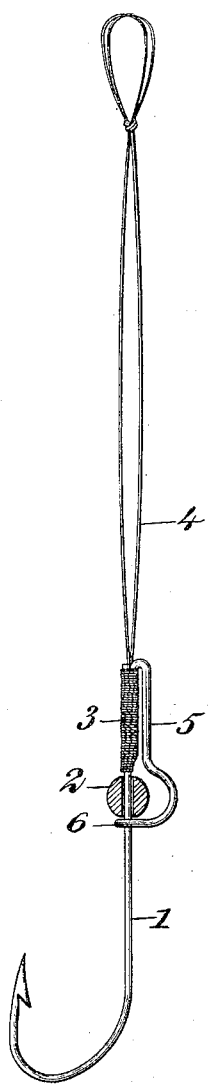
WITNESSES:
J. A. Brophy
C. R. Ferguson
INVENTOR
William E. Koch
BY
Munn
ATTORNEYS No. 745,066. Patented November 24, 1903.

UNITED STATES PATENT OFFICE.

WILLIAM E. KOCH, OF WHITEHALL, NEW YORK.

FISH-HOOK.

SPECIFICATION forming part of Letters Patent No. 745,066, dated November 24, 1903.

Application filed September 17, 1903. Serial No. 173,544. (No model.)

*To all whom it may concern:*

Be it known that I, WILLIAM E. KOCH, a citizen of the United States, and a resident of Whitehall, in the county of Washington and State of New York, have invented a new and Improved Fish-Hook, of which the following is a full, clear, and exact description.

This invention relates to improvements in fish-hooks, an object being to provide a hook with a sliding weight whereby the weight will not only serve as a sinker, but will serve to hold live bait in natural position—that is, with back up.

Other objects of the invention will appear in the general description.

I will describe a fish-hook embodying my invention and then point out the novel features in the appended claims.

Reference is to be had to the accompanying drawings, forming a part of this specification, in which similar characters of reference indicate corresponding parts in both the figures.

Figure 1 shows a fish-hook embodying my invention with the weight in lowered position, and Fig. 2 shows the hook with the weight in position when the hook is to be used with worms or like bait.

Referring to the drawings, 1 designates a fish-hook, slidable on the shank of which is a weight 2, and connected to the end of the shank, as here shown, by means of the winding 3 or the snell 4 is a keeper 5 for holding the weight in uppermost position, as indicated in Fig. 2. This keeper consists of a piece of wire having a portion extended parallel with the hook-shank and having a hook portion 6 for engaging with said hook-shank.

In the operation when using live bait or minnows the weight 2 may be slid along the shank of the hook to any desired position to accommodate the hook for engagement with the bait. The weight will cause the shank portion of the hook to lie below the minnow, thus keeping the bait in a natural position. When worms or other bait are to be used, the weight 2 may be slid up and engaged with the keeper 5, as indicated in Fig. 2.

Having thus described my invention, I claim as new and desire to secure by Letters Patent—

1. The combination with a fish-hook, of a weight arranged to slide on the shank thereof.

2. The combination with a fish-hook, of a weight mounted to slide on the shank thereof, and a keeper for holding the weight in an uppermost position.

3. The combination with a fish-hook, of a weight mounted to slide thereon, and a keeper attached to the shank of the hook and having a hook portion for engaging with the shank of the fish-hook.

In testimony whereof I have signed my name to this specification in the presence of two subscribing witnesses.

WILLIAM E. KOCH.

Witnesses:
ALONZO W. LETTS,
MARIE C. LETTS.